United States Patent
Meyers et al.

[15] 3,704,077
[45] Nov. 28, 1972

[54] THRUST CONTROLLER FOR PROPULSION SYSTEMS WITH COMMONLY DRIVEN, CONTROLLABLE PITCH PROPELLERS

[72] Inventors: Elwood J. Meyers, Rockford; Earl J. Falk, Byron, both of Ill.

[73] Assignee: Barber-Colman Company, Rockford, Ill.

[22] Filed: Nov. 3, 1970

[21] Appl. No.: 86,452

[52] U.S. Cl. ................................................416/30 R
[51] Int. Cl. ................................................B63h 3/10
[58] Field of Search............416/30, 27, 28, 29, 25, 1

[56] References Cited

UNITED STATES PATENTS

| | | | |
|---|---|---|---|
| 2,912,824 | 11/1959 | Van Nest | 416/27 UX |
| 2,696,268 | 12/1954 | Marchant | 416/30 |
| 3,479,822 | 11/1969 | Nelson | 416/30 |
| 3,588,272 | 6/1971 | Kristinehamn | 416/30 |

*Primary Examiner*—Clarence R. Gordon
*Attorney*—Wolfe, Hubbard, Leydig, Voit & Osann

[57] ABSTRACT

A method and apparatus for controlling the thrust delivered by each propeller of a marine propulsion system of the type having a plurality of controllable pitch propellers driven by a common power source. In response to electrical signals supplied to define commanded thrust levels for the propellers, the power source is controlled to provide the power necessary to satisfy the power requirements of the propulsion system and the propeller pitches are individually set so that each propeller absorbs only its proportionate share of the power. Alternative provision is made for carrying out the foregoing in a speed mode or in a power mode. In the speed mode, the power source is controlled in response to any given set of commanded thrust levels so as to maintain the propellers rotating at a substantially constant speed which is selected to be the higher of a predetermined idle speed for the propulsion system and of the minimum speed necessary to satisfy the highest of the commanded thrust levels. In the power mode, the power source is controlled in response to any given set of commanded thrust levels so as to deliver a substantially constant amount of power which is selected to be the power necessary for the propellers to deliver the amounts of thrust commanded therefrom without their shaft speed dropping below the idle speed. The method and apparatus are also compatible with an operation of the propulsion system in which separate engines are dedicated to the several propellers.

12 Claims, 10 Drawing Figures

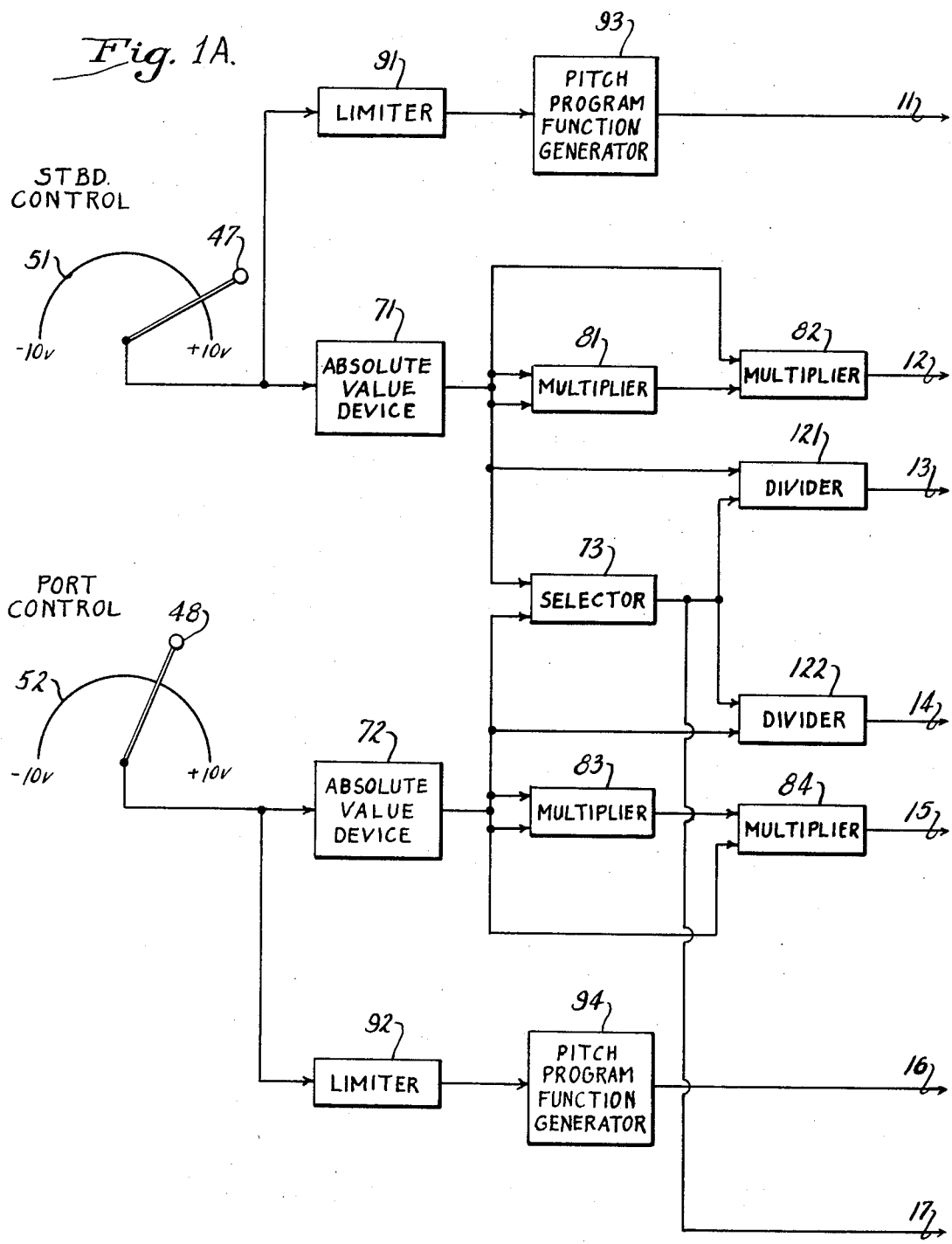

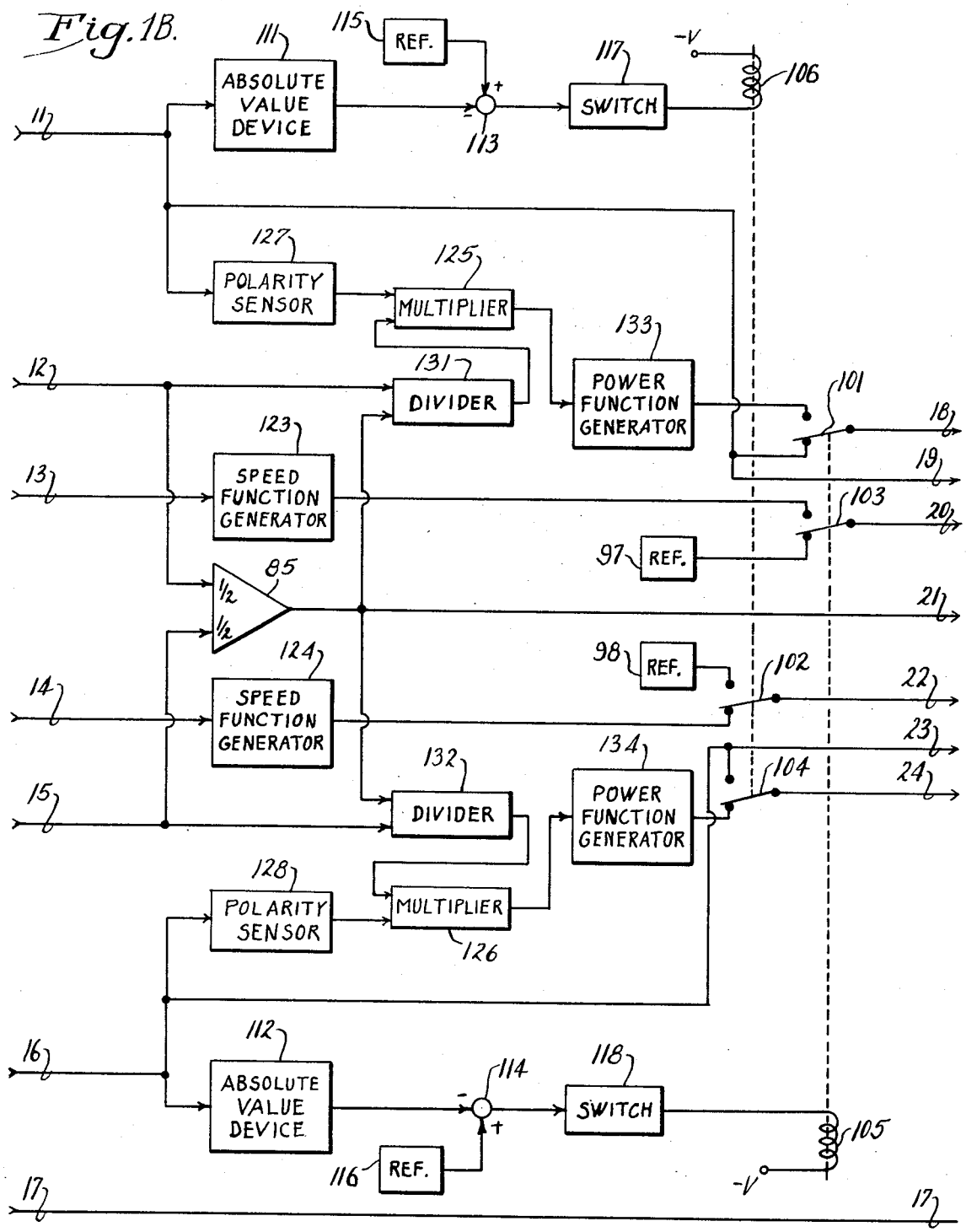

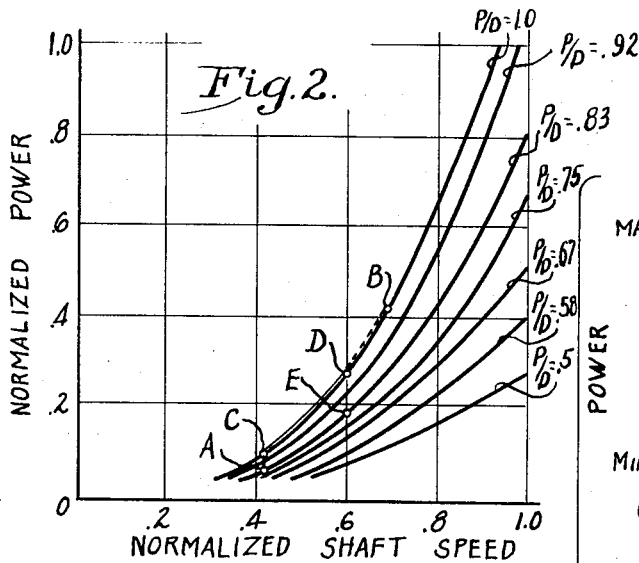
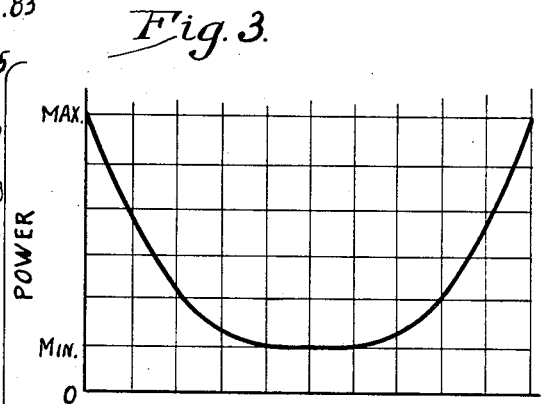
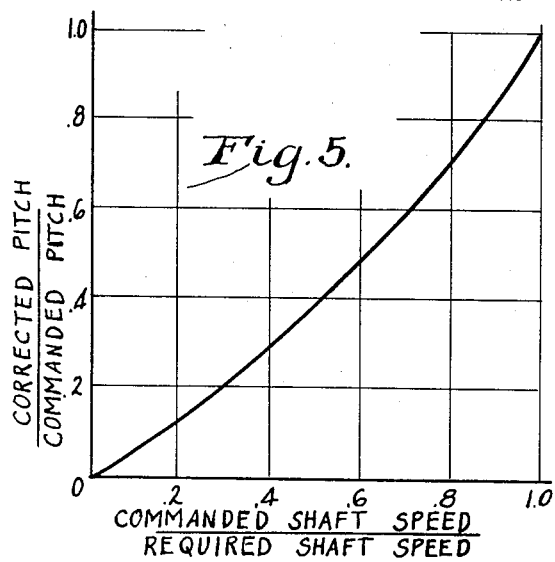
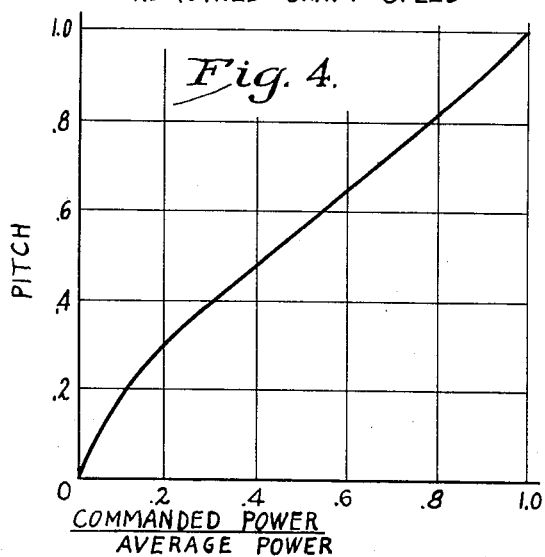
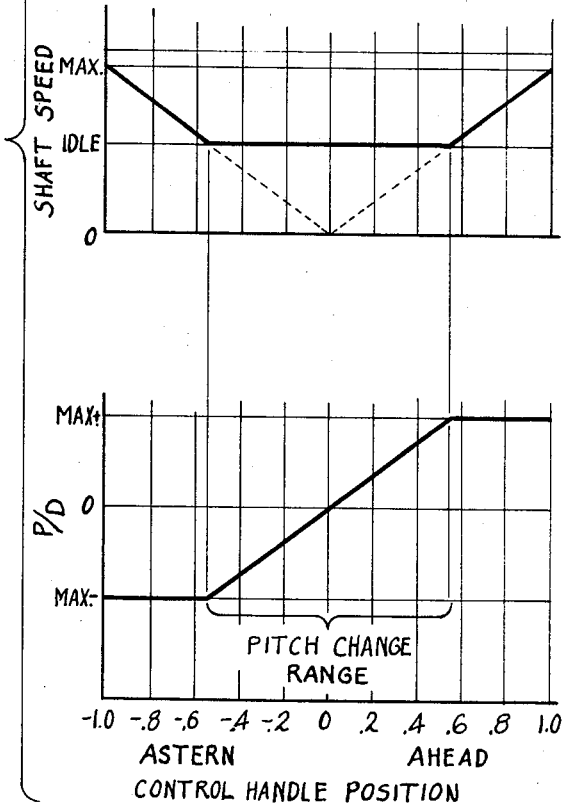
INVENTORS
ELWOOD J. MEYERS
EARL J. FALK
BY
ATTORNEYS

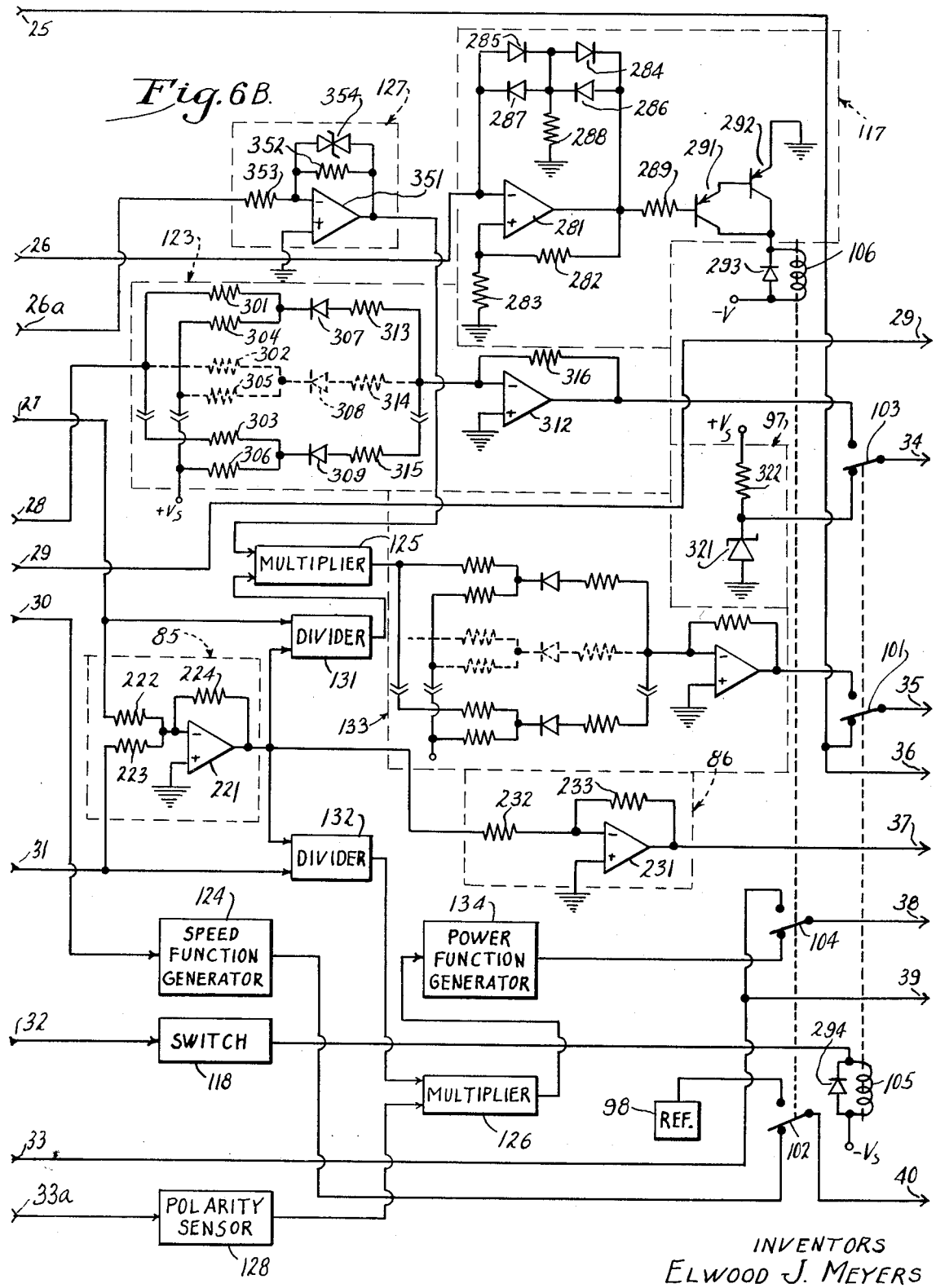

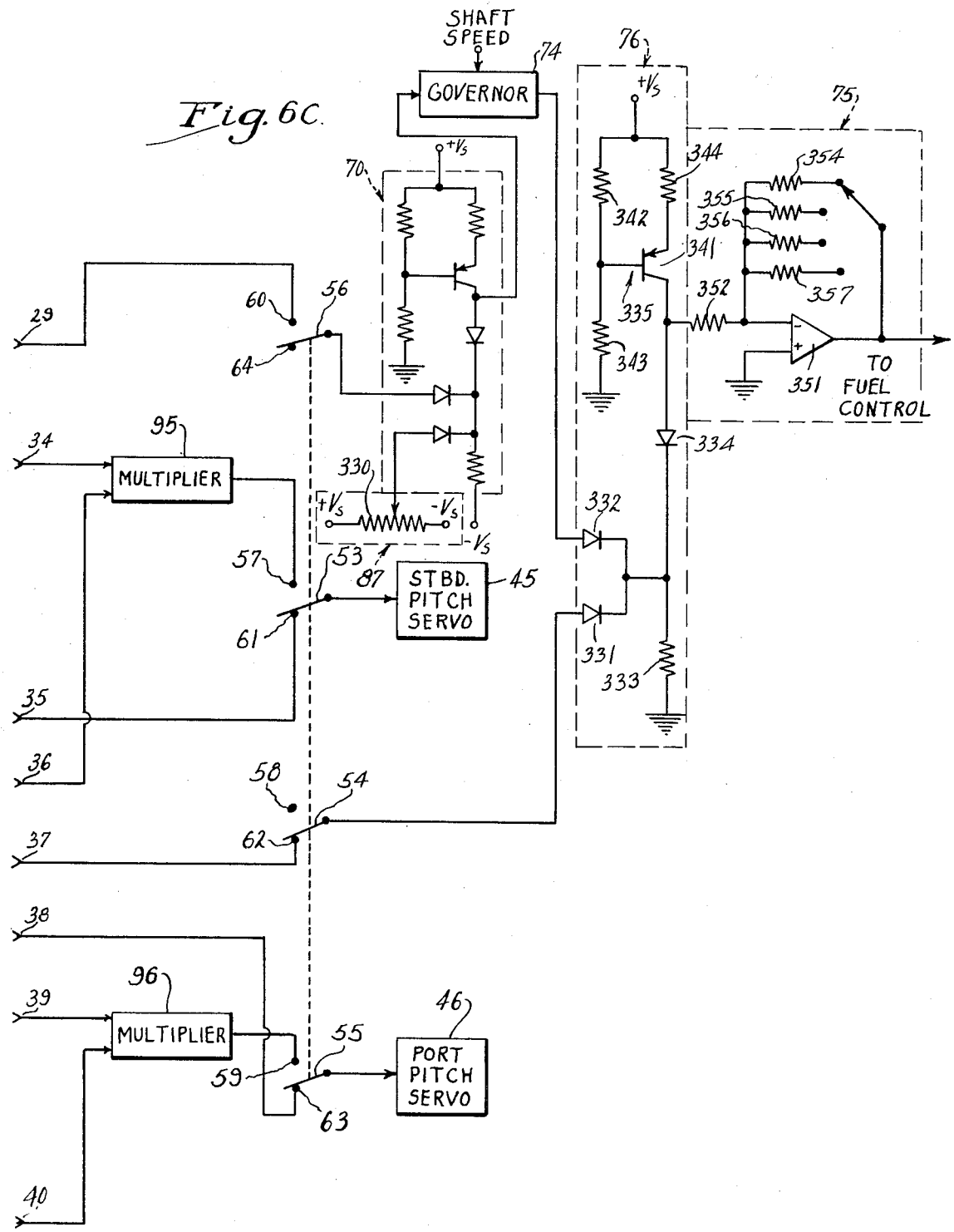

THRUST CONTROLLER FOR PROPULSION SYSTEMS WITH COMMONLY DRIVEN, CONTROLLABLE PITCH PROPELLERS

BACKGROUND OF THE INVENTION

This invention relates to thrust controllers for marine propulsion systems having a plurality of controllable pitch propellers and, more particularly, to thrust controllers for propulsion systems of the foregoing type wherein provision is made for driving two or more propellers with a common power Many of the propulsion systems currently in use on commercial and military ships, as well as on a few of the larger pleasure craft, have two or more controllable pitch propellers. Generally, the standard operating mode for such a propulsion system involves dedicating one or more engines, such as gas turbines or diesels, to each propeller. However, as one result of efforts that have been made to provide increased flexibility, provision is frequently made for another mode in which two or more of the propellers are simultaneously driven by all or part of the engines acting as a single power source. For instance, a selectively engageable power transfer coupling is often included for interconnecting the propeller shafts so that the propellers may share the output of one or more of the engines.

The thrust controller of the present invention is compatible with propulsion systems operating with separate engines dedicated to each of the controllable pitch propellers, but its primary advantages are realized in connection with its application to commonly driven controllable pitch propellers. Heretofore, the latter operating mode has been employed primarily for back-up purposes, such as when the engine or engines for one or more of the propellers is shut down for maintenance purposes or the like. However, the thrust controller of the present invention may also be advantageously employed with propulsion systems which are normally operated with fewer engines delivering power than propellers being driven, e.g., propulsion systems having only a single engine for driving a plurality of controllable pitch propellers.

As is known, the thrust delivered by a ship's propeller depends on the power it absorbs which, in turn, depends on its pitch, the speed at which it is driven, and its axial velocity relative to the water. Accordingly, to take full advantage of the controllable or variable pitch propeller, provision is usually made in propulsion systems comprising such propellers for controlling the pitches of the propellers, as well as the engine outputs. As is also known, for fuel economy, it is preferable that the thrust control function for any given propeller be carried out as far as possible by adjusting the propeller pitch while it is driven at a predetermined idle speed so that the circumstances in which higher fuel consumption rates are required are limited to those in which the thrust commanded from the propeller cannot be delivered with the propeller at its full forward or reverse design pitch, i.e., with its slip minimized. Normally, the thrust control function is effected pneumatically, hydraulically, or electrically. For example, in marine propulsion systems having a plurality of controllable pitch propellers, provision is usually made to supply thrust control signals which are variable within a predetermined pitch change range to adjust the pitch settings of the propellers and outside the pitch change range to adjust the engine outputs. Customarily, for command control of the thrust levels for the propellers, the thrust control signals are provided through the operation of manually positionable control handles. However, if automatic control is desired, the thrust control signals may equally as well be provided by an on-board computer or the like.

In view of the foregoing, it will be understood that so long as propulsion systems such as outlined hereinabove are operated in the standard mode with one or more engines dedicated to each of the propellers, the thrust control problems are relatively straightforward since there is no tendency for adjustments made to satisfy the thrust requirements of one propeller to effect the thrust delivered by any of the other propellers. However, in propulsion systems with two or more controllable pitch propellers being driven by a common power source there is a thrust control problem for which no satisfactory solution has been previously found. Specifically, heretofore it has been impossible to closely control the thrust delivered by each propeller in such a propulsion system whenever different thrust levels are called for from them, such as for a turning maneuver, and one or more of the commanded thrust levels cannot be satisfied by driving the propellers at idle speed.

SUMMARY OF THE INVENTION

Accordingly, it is an object of the present invention to provide an accurate and unambiguous thrust control method and apparatus for marine propulsion systems of the type having a plurality of controllable pitch propellers driven by a common power source. A more detailed related object is to provide a method and apparatus for accurately controlling the thrust delivered by each propeller of such a propulsion system under all operating conditions of the propulsion system such that the thrust delivered by any of the propellers is not effected by adjustments made to change the thrust delivered by other of the propellers, except as those adjustments effect ship's speed.

Another object of this invention is to provide a method and apparatus for closely controlling the thrust delivered by the propellers of marine propulsion systems of the foregoing type at all commanded thrust levels for the propellers. More particularly, an object is the provision of a method and apparatus for controlling the power supplied by the power source as necessary to satisfy the commanded thrust levels of the several propellers and for adjusting the propeller pitches so that each of them absorbs only its proportionate share of the power supplied by the power source. In keeping with one aspect of the invention, a related object is to provide a method and apparatus for carrying out the foregoing in a speed mode in which the power source is controlled so as to maintain the propellers rotating at a substantially constant speed for any given set of commanded thrust levels. In keeping with a second aspect of the invention, another related object is to provide a method and apparatus for carrying out the foregoing in a power mode in which the power source is controlled so as to maintain the power delivered by the power source substantially constant for any given set of commanded thrust levels.

A further object of the present invention is to provide a method and apparatus for substantially independently adjusting the amount of thrust delivered by each propeller in a marine propulsion system of the foregoing type regardless of the particular operating conditions of the propulsion system. A more detailed related object is to provide a method and apparatus whereby the thrust delivered by each propeller of such a propulsion system is established simply by positioning a control handle for the propeller and is then substantially independent of the positioning of similar control handles for the other propellers.

Still another object of the present invention is to provide an unambiguous thrust controller which is suitable for use with a wide variety of marine propulsion systems of the type that have, as either a normal or an alternative operating mode, a plurality of controllable pitch propellers driven by one or more engines acting as a common power source. A related object is to provide a thrust controller of the foregoing type which is responsive to the analog representations usually used in such propulsion systems to represent the commanded thrust levels for the propellers and which is, therefore, readily adaptable to use with existing propulsion systems. Also, an object is the provision of a thrust controller of the foregoing type which is compatible with operation of the propulsion systems with separate engines dedicated to each of the propellers.

BRIEF DESCRIPTION OF THE DRAWINGS

Other objects and advantages of the present invention will become apparent when the following detailed description is read in conjunction with the attached drawings, in which:

FIGS. 1A–1C, when joined by the aligned junctures 11–24, form a block diagram of an exemplary electrically responsive thrust controller embodying the present invention as applied to an exemplary propulsion system having two controllable pitch propellers and separate control handles for supplying the thrust control signals for the propellers.

FIG. 2 is a family of normalized curves which illustrate for a typical controllable pitch propeller the relationship between the shaft speed of the propeller and the power it absorbs as a function of its pitch setting.

FIG. 3 is a series of curves which illustrate, in descending order, typical relationships of the position of the control handle for a controllable pitch propeller to the power, shaft speed and pitch setting, respectively, commanded for the propeller.

FIG. 4 illustrates a typical nonlinear transfer function which may be advantageously employed during speed mode operation of the thrust controller shown in FIG. 1 to tailor the connected pitch signals to the power versus speed characteristics of the particular propellers comprised by the propulsion system.

FIG. 5 illustrates another typical nonlinear transfer function which may be advantageously employed during power mode operation of the thrust controller shown in FIG. 1 to tailor the connected pitch signals to the power versus speed characteristics of the particular propellers comprised by the propulsion system.

FIGS. 6A–6C, when joined by the aligned junctures 25–40, further illustrate, partly in schematic and partly in block diagram form, an implementation of the thrust controller shown in FIG. 1.

DETAILED DESCRIPTION OF THE ILLUSTRATED EMBODIMENT

While the invention is described in detail hereinafter with reference to an illustrated embodiment, it is to be understood that the intent is not to limit it to that embodiment. To the contrary, the intent is to cover all modifications, alternatives and equivalents falling within the spirit and scope of the invention as defined by the appended claims.

A. General Background and Environment

Figure 1C:
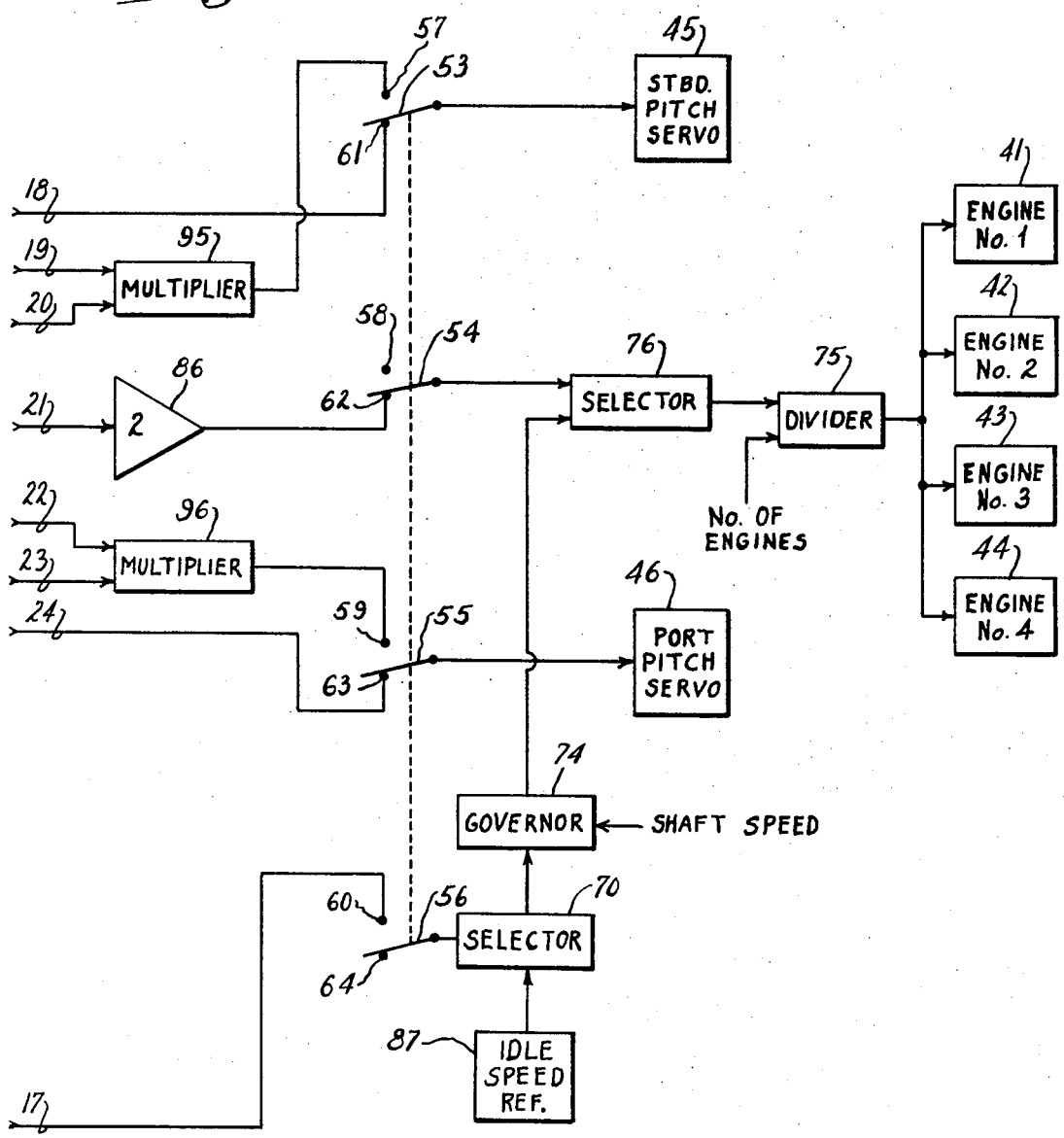

Turning now to the drawings, and particularly to FIGS. 1A–1C, it will be seen that the thrust controller of the present invention has been shown for exemplary purposes as being applied to a marine propulsion system having four engines 41–44 acting as a single power source to drive a pair of controllable pitch propellers, specifically, a starboard and a port propeller. Neither the propellers per se nor the power transfer coupling between them has been shown since they may be entirely conventional and such a showing would lend nothing to an understanding of the invention. However, the usual pitch control servos 45 and 46 for the starboard and port propellers have been shown to indicate that the pitches of the propellers are, in fact, controllable or variable.

It will, of course, be understood that the thrust controller may be used to advantage whenever a plurality of controllable pitch propellers are driven by a common power source, regardless of the number of propellers involved. Indeed, the thrust controller need not necessarily involve all of the propellers on a given ship and it, therefore, may be employed for any part of a ship's propellers that are driven by the same power source.

The significance of the present invention can best be understood in light of a comprehensive understanding of its intended environment. To that end, a family of curves which illustrate the relationship for a typical controllable pitch propeller between its shaft speed and the power it absorbs as a function of its pitch setting have been shown in FIG. 2. As will be appreciated, these curves depend on a number of complex and interdependent variables, including the characteristics of the propeller, and the windage and hull characteristics of the ship on which the propeller is installed. Accordingly, they are not readily defined analytically. However, since the curves of FIG. 2 are referred to during the subsequent discussion and are of considerable importance to the thrust control provided in accordance with the present invention, it is noted at the outset that the illustrated curves, as well as the curves for other pitch settings, may be empirically derived by model tests and corrected as necessary by ship board tests, such as might be performed during trial runs. The preferred method for empirically deriving the curve for any particular pitch setting is to maintain the pitch setting constant while the propeller shaft speed is incrementally increased. The power absorbed by the propeller is then measured at each speed increment. Since the accuracy of the thrust controller depends in large part on the preciseness with which the shaft speed versus absorbed power characteristic of the propeller is known, the above process should be repeated for enough different pitch settings to ensure that the interpolation errors in estimating the shaft speed versus absorbed power characteristics for any given pitch setting not actually involved in the tests are reduced to a tolerable level for the particular propulsion system with which the thrust controller is to be used.

Of course, with the present practice of using matched propellers (i.e., propellers with substantially identical characteristics) throughout any given propulsion system, the shaft speed versus absorbed power curves derived for one propeller on any given ship apply substantially as well to each of the other propellers on the same ship. Also, while the shaft speed and absorbed power values have been normalized by dividing each speed reading by the maximum shaft speed and each absorbed power reading by the maximum power available from the power source in the interest of generalizing the curves shown in FIG. 2 as far as possible, it will be understood that the curves may be plotted directly as a function of the actual shaft speed and the actual power absorbed.

Returning to FIGS. 1A–1C, to carry out the present invention, provision is made to represent the commanded thrust levels for the commonly driven propellers by respective electrical signals which are supplied to the thrust controller as input or thrust control signals. Various methods, including those involving pre-programmed or other forms of automatic control over the ship's speed and heading, may be used to supply the thrust control signals. However, to highlight the previously mentioned compatibility of the thrust controller with existing propulsion systems, the thrust control signals are here illustrated as being supplied through the operation of separate control handles 47 and 48 for the starboard and port propellers.

In keeping with conventional practices, the control handles 47 and 48 are shown as being manually adjustable forwardly and rearwardly from a "dead center" or straight up position to provide ranges of ahead and astern thrust settings for their corresponding propellers. Further suitable means such as the linear potentiometers diagrammatically indicated at 51 and 52, are provided for converting the positions of the control handles 47 and 48 to thrust control signals for their respective propellers. In this case, the potentiometers 51 and 52 are biased so that there are null or zero voltage points corresponding to the dead center positions of the control handles 47 and 48. Thus, it will be seen that the voltage levels of the thrust control signals vary linearly as a function of the positions of the control handles 47 and 48 and have polarities which depend on whether the control handles 47 and 48 are forwardly or rearwardly of their dead center positions. In other words, the thrust control signals have magnitudes or absolute values representative of the amounts of thrust commanded for their corresponding propellers and polarities representative of the sense or direction of the commanded thrusts.

As previously mentioned, the thrust delivered by a controllable pitch propeller depends on the power absorbed by the propeller which, in turn, depends on its pitch, shaft speed, and axial velocity through the water. When separate control handles 47 and 48 are provided for the propellers of a propulsion system, the position of each control handle can be translated into a combination of the power, shaft speed, and pitch setting of the associated propeller which will satisfy the commanded thrust level represented by the control handle position. For example, if the customary practice of providing for an approximately linear change in ship's speed with control handle position is followed, the relationships of the control handle positions to the commanded power, shaft speed and pitch setting for a given one of the propellers is as shown in FIG. 3. That is, the power commanded for a representative one of the propellers is an approximately cubic function of its control handle position plus a constant corresponding to the minimum power necessary to maintain the propeller while at zero pitch rotating at a predetermined idle speed. The commanded shaft speed for the propeller is nearly a linear function of handle position for all handle positions outside a predetermined pitch change or maneuvering range and is a constant corresponding to the idle speed for all handle positions within the pitch change region. As used hereinabove, the "idle speed" for any given propulsion system is the propeller shaft speed which affords a direct correspondence between the commanded pitch setting and the commanded power level for the propeller at any handle position within the pitch change region. Finally, the commanded pitch for the propeller varies between full forward and reverse design pitches as a linear function of handle position for handle positions within the pitch change region.

Inspection of FIG. 3 shows that when the control handles 47 and 48, or more generally, the thrust control signals, are all within the pitch change range, the commanded power, shaft speed, and pitch settings for the respective propellers are available to satisfy their commanded thrust levels. This follows directly from the fact that both propellers have the same commanded shaft speed—namely, the predetermined idle speed. Thus each propeller can be adjusted to its commanded pitch setting and the output from the common power source 41–44 can be adjusted to either supply the sum of the individual commanded power levels for the propellers or to maintain the interconnected propeller shafts rotating at the predetermined idle speed. The same does not hold true, however, when one or more of the control handles 47 and 48 is positioned to supply a thrust control signal which is outside the pitch change range, except for the case in which the positions of the control handles 47 and 48 are matched to command identical thrust levels for their associated propellers. Specifically, assuming that the control handles are not matched and one or more of them is outside the pitch change range, it will be seen that the power source output cannot be adjusted to simultaneously satisfy the commanded thrust levels for both the propellers, if the propellers are set at their commanded pitches. That is, if the power source 41–44 is adjusted to deliver the total power commanded by the propellers, the interconnected propeller shafts will run at a speed above the shaft speed commanded for the propeller with the lower commanded thrust level. As a result, that propeller will deliver more thrust than it should, while the other propeller will deliver less thrust than it should. If, on the other hand, the power source output is increased or decreased from its commanded set point, the error between the commanded and delivered thrust levels for one or the other of the propellers will increase.

To further illustrate the foregoing, a specific example based on FIG. 2 will be helpful. Assume for that purpose an idle speed for the exemplary propulsion system equal to approximately 42 percent of the maximum shaft speed. Consider then common initial operating points A for the propellers such as results from the control handles 47 and 48 being matched and in the pitch change range to supply thrust control signals which command that their respective propellers each have a pitch equal to about 75 percent of full design pitch and that each of the propellers receive approximately 7 percent of the maximum power available from the power source 41-44. Thus, the total power initially commanded from the power source 41-44 is roughly 14 percent of the power it is capable of delivering. Now, assume that one of the control handles, say the starboard control handle 47, is advanced to a position outside its pitch change range to thereby provide a changed thrust control signal to define a new desired operating point B for the starboard propeller. At the same time, assume that the other or port control handle 48 remains in its initial position. It will be seen that under the new conditions, the total power commanded from the power source 41-44 is approximately 49 percent of its capacity; 42 percent for the starboard propeller and 7 percent for the port propeller. However, after the starboard propeller reaches its full design pitch at C, the only way it can absorb increased power from the power source 41-44 is to be driven at a higher shaft speed. Since the propeller shafts are interconnected, it will be seen that as the shaft speed for the starboard propeller increases toward the operating point B, the shaft speed for the port propeller also increases. Consequently, final operating points D and E are reached by the starboard and port propellers at which they absorb the power supplied by the power source 41-44, but the distribution of the power between them does not correspond to their commanded thrust levels as dictated by the positions of their control handles 47 and 48. That is, at its final operating point D, the starboard propeller absorbs only about 29 percent of the maximum power available from the power source 41-44 and, therefore, falls short of its commanded thrust level by approximately 31 percent. On the other hand, at its final operating point E, the port propeller absorbs about 20 percent of the capacity of the power source 41-44 and, therefore, overshoots its commanded thrust level by roughly 187 percent.

As will be appreciated, such substantial errors between the commanded thrust levels for the propellers and the amounts of thrust actually delivered thereby are highly undesirable even though they appear only when different amounts of thrust are commanded from the propellers and one or more of the propellers is operating outside its pitch change range. The errors reduce the thrust differential between the propellers. Even more importantly, they create a situation in which the commanded thrust levels for the propellers do not unambiguously and accurately represent the amounts of thrust actually delivered thereby. Consequently, the potential errors are an impediment to precise navigation such as may be required for maneuvering in close quarters.

In accordance with the present invention, potential errors between the thrust levels commanded from the propellers and the amounts of thrust actually delivered thereby are substantially eliminated (1) by controlling the power source so that the power it supplies corresponds to the power required to satisfy the commanded thrust levels for all of the propellers and (2) by setting the pitches of the propellers so that each of them absorbs only its proportionate share of the power, i.e., the power required to satisfy its particular commanded thrust level. More particularly, the pitch of each propeller is set at the pitch commanded for it, except when the thrust control signal for one or more of the other propellers is outside the predetermined pitch change range. When, however, the thrust control signal for any propeller is outside the pitch change range to thereby command a shaft speed for the propellers in excess of the predetermined idle speed, the pitch of each of the other propellers is set so as to deliver the thrust commanded therefrom when driven at the increased shaft speed. In other words, whenever the shaft speed required to enable one or more of the propellers to deliver the thrust commanded therefrom is higher than the shaft speed or speeds required to enable any of the other propellers to deliver the thrust commanded therefrom, the power source is controlled so as to satisfy the requirements of the propellers calling for the higher shaft speed and the pitches of the other propellers are decreased so as to compensate for the higher shaft speed.

The particular thrust controller shown in FIGS. 1A-1C is capable of performing the foregoing function in alternative operating modes, viz., a speed mode in which the power source 41-44 is controlled in response to any given set of commanded thrust levels so that the shaft speed of the propellers is maintained substantially constant at the idle speed or whatever higher speed is required to satisfy the highest of the commanded thrust levels, and a power mode in which the power source 41-44 is controlled in response to any given set of commanded thrust levels so that the power delivered to the propellers is held substantially constant at the minimum power necessary to satisfy the commanded thrust levels while preventing the shaft speed for the propellers from dropping below the predetermined idle speed for the propulsion system.

In practice it is desirable, but not necessary, to have both operating modes. Suitably, for selecting the desired mode, a series of ganged switches 53-56 may be included to selectively couple the power source 41-44 to the control circuits of the thrust controller that are appropriate to one or the other of the modes. As here shown, speed mode operation is obtained when the switches 53-56 are thrown upwardly to contact the terminals 57-60 and power mode operation is obtained when they are thrown downwardly to contact the terminals 61-64. However, either one of the thrust controller operating modes may be provided without the other. Thus, to indicate the severable nature of the alternative operating modes, the following more specific discussion of the thrust controller is set forth in separately headed sections.

B. Power Source Control — Speed Mode

As previously mentioned, during speed mode operation, an objective is to control the power source so that the propellers rotate at a substantially constant speed which is selected to be the predetermined idle speed or whatever higher shaft speed is required to satisfy the highest of the commanded thrust levels. As shown by FIG. 3, in the illustrated embodiment the commanded shaft speeds for the propellers depend on the positions of their respective control handles 47 and 48. Moreover, since the thrust control signals are linearly related to positions of the control handles 47 and 48, the illustrated relationship between control handle position and commanded shaft speed directly defines the commanded shaft speed for a representative propeller as a function of its thrust control signal — viz., the commanded shaft speed for the propeller is the predetermined idle speed of the propulsion system when the thrust control signal is within a predetermined pitch change range and varies as a substantially linear function of the thrust control signal when the thrust control signal is outside the pitch change range. Also, as here shown, the potentiometers 51 and 52 are biased so that the thrust control signals supplied thereby are each symmetrical about a zero voltage level corresponding to a zero commanded thrust level for the corresponding propeller. Thus, when the thrust control signals are at the upper and lower ends of the pitch change range, they are offset from a zero or ground reference by equal voltages of opposite polarity.

Accordingly, to control the power source 41–44 during speed mode operation of the thrust controller, the thrust control signals for the starboard and port propellers are fed from the potentiometers 51 and 52 through respective absolute value devices 71 and 72 to a selector 73. The signals supplied by the absolute value devices 71 and 72 depend only on the amplitudes of the thrust control signals and are, therefore, representative of the commanded shaft speeds for the propellers so long as the thrust control signals are outside the pitch change range. The selector 73, on the other hand, selects the highest of the absolute value signals and applies it via line 17 through the mode switch 56 (FIG. 1C) to the first input of another highest value selector 70. A reference source 87 supplies a reference signal which is representative of the predetermined idle speed. The reference signal is applied to the second input of the selector 70. Thus, the selector 70 provides a required speed signal which is representative of the predetermined idle speed or any higher speed commanded to satisfy the highest of the commanded thrust levels. As will be appreciated, to afford a smooth transition between the idle speed level of the required speed signal and the higher commanded speed levels, the reference signal supplied by the reference source 87 should have a value substantially equal to the absolute values of the thrust control signals when they are at the upper and lower limits of the pitch change range.

The required speed signal is fed from the selector 70 to the control input of a governor 74. The other or reference input of the governor 74 is supplied by a suitable transducer (not shown) with a feedback signal which is representative of the actual shaft speed of the propellers. Thus, the governor 74 provides a speed error signal whenever the actual shaft speed is below the required shaft speed. The speed error signal is, in turn, applied to a divider 75 through a selector 76. The selector 76 performs no function during speed mode operation of the thrust controller and can, therefore, be eliminated if provision is not desired for operation in the alternative power mode. The divider 75, however, is used to divide the speed error signal by the number of engines thereby providing an engine control signal which is of the appropriate amplitude for corrective application to the parallel fuel controllers, commonly referred to as the power lever angle actuators (not shown), of the several engines 41–44. That is, the engine control signal adjusts the fuel controllers for the engines 41–44 so as to eliminate any error between the actual shaft speed and the required shaft speed for the propellers. Thus, it will be seen that during speed mode operation of the thrust controller, the engines 41–44 are controlled so as to maintain the propellers rotating at a substantially constant speed which is selected to be the predetermined idle speed or whatever higher speed is commanded to satisfy the highest of the commanded thrust levels for the propellers.

As will be appreciated, the signals supplied by the absolute value devices 71 and 72 may be separately employed with appropriate idle speed references and governors (not shown) for speed mode control when separate engines are dedicated to the several propellers.

C. Power Source Control — Power Mode

When the thrust controller is operated in its power mode, the power source 41–44 is controlled in response to any given set of thrust control signals so that it delivers the power necessary to satisfy the commanded thrust levels while preventing the propeller shaft speed from dropping below the predetermined idle speed for the propulsion system. For that reason, in the illustrated embodiment, the signals supplied by the absolute value devices 71 and 72 are cubed by successive multiplier stages 81, 82 and 83, 84 to provide signals which are representative of commanded power levels for the respective propellers. The commanded power signals may, of course, be separately employed for direct power source control if each propeller has a separate power source dedicated thereto. When, however, the propellers are driven by the same power source 41–44, the commanded power signals are summed to provide a signal representative of the total power required from the power source 41–44.

As shown in FIGS. 1A–1C and as discussed in a following section, to accommodate the provision that is made to supply corrected pitch signals for the propellers during power mode operation of the thrust controller, the commanded power levels for the individual propellers are summed by first being applied to an averaging circuit 85 which provides a signal that is representative of the average power commanded per propeller from the power source 41–44. The average power signal is then applied to an amplifier 86 which has a gain equal to the number of propellers in the propulsion system and which, therefore, provides a signal representative of the sum of the commanded power signals for the individual propellers, i.e., the total power required from the power source 41–44.

To limit the lowest shaft speed for the propellers to the predetermined idle speed, the governor 74 is again employed to provide a speed error signal. However, in the power mode, the selector 70 receives only the idle speed reference signal supplied by the reference source 87. Thus, whenever the actual shaft speed drops below the idle speed, the governor 74 provides a speed error signal with an amplitude which ideally corresponds to a command for substantially full power from the power source 41–44.

Consequently, to control the power source 41–44, the required power and speed error signals are applied to the selector 76 which selects the highest as the control signal for the engines. The control signal is, in turn, applied to the divider 75 which divides it by the number of engines so that the resultant control signal is of proper amplitude for parallel application to the fuel controllers or power lever angle actuators (not shown) of the engines 41–44. As will be understood, when one or more of the thrust control signals is outside the pitch change range, the required power signal is generally selected as the engine control signal. If, however, the thrust control signals are all within the pitch change range, the speed error signal is available to assure that the shaft speed of the propellers does not drop below the idle speed.

In keeping with accepted practices, an overspeed governor (not shown) may be included for power mode operation of the controller to limit the maximum shaft speed of the propellers.

D. Commanded Pitch Signals — Speed and Power Modes

Substantially the same provision is made for both the speed mode and the power mode to derive signals which are representative of the commanded pitches for the propellers from their respective thrust control signals. Specifically, the thrust control signals supplied by the potentiometers 51 and 52 are applied through limiting circuits 91 and 92 to respective function generators 93 and 94. The limiting circuits 91 and 92 prevent the pitch control servos 45 and 46 for the propellers from being overdriven by limiting the commanded pitch signals applied thereto to a range between predetermined upper and lower limits or, more particularly, positive and negative values corresponding to full forward and reverse design pitch, respectively, of the associated propellers. The function generators 93 and 94, on the other hand, supply the commanded pitch signals for the pitch control servos 45 and 46 in response to the thrust control signals provided by the potentiometers 51 and 52 as limited by the limiting circuits 91 and 92.

The function generators 93 and 94 are not strictly necessary for the illustrated embodiment, since a linear relationship has been assumed to exist in the pitch change range between the pitches commanded for the propellers and their respective thrust control signals (FIG. 3). However, they have been included to indicate that the relationship need not be linear. That is, the function generators 93 and 94 may be used when desired to expand or compress one or more portions of the pitch change range to thereby provide a predetermined nonlinear pitch program for the propellers. For example, the function generators 93 and 94 may have different transfer functions for positive and negative input signals to thereby provide a commanded pitch versus thrust control signal or handle position pitch program characterized by a relatively steep slope for one portion, say the astern portion, of the pitch change range and a relatively shallow slope for the other or the ahead portion of the pitch change range. Such a pitch program would, of course, provide a smoother and more gradual response for the usual maneuvering ahead and a sharper and more positive response for maneuvering astern.

At any rate, regardless of the particular pitch program selected for the propellers, so long as the thrust control signals for the propellers are all within the pitch change range, the commanded pitch signals provided by the function generators 93 and 94 represent the pitch settings at which the starboard and port propellers absorb only their proportionate share of the power supplied by the power source 41–44. The foregoing follows as a matter of definition for both speed and power mode operation of the thrust controller since in either mode, when the thrust control signals are all within the pitch change range, the power delivered by the power source 41–44 is substantially equal to the sum of the amounts of power absorbed by the respective propellers when driven at the predetermined idle speed and set at their commanded pitches. It does not, however, necessarily hold true when the thrust control signal for one or more of the propellers is outside the pitch change range, since the thrust control signals may then be calling for different shaft speeds for the propellers.

To accommodate the different provisions made for supplying corrected pitch signals for the propellers during speed and power mode operation of the thrust controller, there are different circuits for conducting the commanded pitch signals to the servos of their respective propellers. Specifically, during speed mode operation, the commanded pitch signals are conducted to the pitch control servos 45 and 46 for the starboard and port propellers through respective multipliers 95 and 96, whereas during power mode operation the commanded pitch signals are applied directly to the pitch control servos 45 and 46. However, the effect is the same for both modes, since in the speed mode the commanded pitch signal for each propeller is multiplied by unity so long as the thrust control signal for the other propeller is within the pitch change range. Suitably, respective references sources 97 and 98 may be employed to provide reference signals for effecting the unity multiplication.

E. Selective Application of Commanded and Corrected Signals — Speed and Power Modes As previously noted, the commanded pitch signal for each propeller defines the pitch setting at which the propeller absorbs its proportionate share of the power supplied by the power source 41–44 when the thrust control signals for the other propellers are all within the pitch change range. On the other hand, the corrected pitch signal for each propeller defines the pitch setting at which the propeller absorbs its proportionate share of the power when the thrust control signal for one or more of the other propellers is outside the pitch change range. The sources for supplying the commanded and corrected pitch signals are discussed in other sections hereof. In this section attention is focused on the provision that is made for selectively applying the commanded and corrected pitch signals to the pitch control servos for the respective propellers.

More particularly, it will be seen that in the illustrated embodiment, there is a first set of switches 101, 102 and a second set of switches 103, 104 through which the control signals for the starboard and port pitch control servos 45 and 46 are passed during operation of the thrust controller in its power and speed modes, respectively. The switches 101 and 103 for the starboard pitch control servo 45 are paired for control by a relay 105 which is energized and de-energized under the control of a detector which senses whether the thrust control signal for the port propeller is within or without the pitch change range. Similarly, the switches 102 and 104 for the port pitch control servo 46 are paired for control by a relay 106 which, in turn, is energized and de-energized under the control of another detector which senses whether the thrust control signal for the starboard propeller is within or without the pitch change range.

For example, as shown for the case of the starboard pitch control servo 45, when the thrust control signal for the other or port propeller is within the pitch change range so that the relay 105 is energized, the commanded pitch signal for the starboard propeller is applied to its pitch control servo 45 via one or the other of the switches 101 and 103 as determined by the position of the associated mode selector switch 53. On the other hand, as shown for the port pitch control servo 46, when the thrust control signal for the other or starboard propeller is outside the pitch change range so that the relay 106 is de-energized, a corrected pitch signal for the port propeller is applied to its pitch control servo 46 via one or the other of the switches 102 and 104 depending on the position of the associated mode selector switch 55. Specifically, when the mode selector switch 55 is in contact with the terminal 63 for power mode operation of the thrust controller and the thrust control signal for the starboard propeller is outside the pitch change range, a power mode corrected pitch signal is applied to the port pitch control servo 46 via the switch 104. If, however, the mode selector switch 55 is transferred into contact with the terminal 59 for speed mode operation while the starboard thrust control signal remains outside the pitch change range, a speed mode corrected pitch signal is provided via the switch 102.

To determine whether the thrust control signals are within or without the pitch change range, provision is made for detecting whether or not the commanded pitch signals provided in response thereto are representative of full forward or reverse design pitch settings of their corresponding propellers. To that end, the detectors for the starboard and port propellers respectively comprise absolute value devices 111 and 112 which convert the commanded pitch signals provided by the function generators 93 and 94 to absolute values for comparison in comparators 113 and 114 against reference signals, such as may be supplied by suitable reference source 115 and 116. Each of the reference signals is selected to have a value substantially equal to the absolute value of the commanded pitch signal corresponding to a full forward or reverse pitch setting of the propeller. Accordingly, to energize and de-energize the relays 106 and 105 in dependence on whether the respective thrust control signals for the starboard and port propellers are within or without the pitch change range, the outputs of the comparators 113 and 114 are respectively coupled to the relays 106 and 105 through switches 117 and 118. As will be seen, the switch 117 is actuated to energize the relay 106 only when the thrust control signal for the starboard propeller is within the pitch change range. Likewise, the switch 118 is actuated to energize the relay 105 only when the thrust control signal for the port propeller is within the pitch change range.

Of course, the control circuitry for transferring the pitch control function between the commanded and corrected pitch signal supplies may be expanded to accommodate any number of propellers by including a detector circuit such as 111, 113, 115 and 117, a control relay such as 106, and relay controlled switches such as 101 and 103 for each of the propellers. In the event that three or more propellers are involved, it will be understood that corrected pitch signals should be supplied for any given propeller whenever the thrust control signal for one or more of the other propellers is outside the pitch change range. To that end, provision should be made for transferring the pitch control servo for any given propeller from its commanded pitch signal source to its appropriate corrected pitch signal source in response to a commanded full pitch setting for any one or more of the other propellers.

F. Corrected Pitch Signals — Speed Mode

As previously noted, during speed mode operation of the thrust controller, the power source 41–44 is controlled in response to any given set of thrust control signals for the propellers so as to drive the propellers at a substantially constant speed, which may or may not be equal to the commanded shaft speed for a given one of the propellers. From time-to-time the power supplied by the power source may change as a result of variations of the loads on the propellers. Accordingly, the pitches of the propellers can be more reliably and accurately set in view of the required shaft speed for the propulsion system. To that end, for speed mode operation, provision is made for setting the pitches of the propellers so that each of them has an "effective shaft speed" generally equal to its commanded shaft speed, even if the commanded shaft speed does not equal the required shaft speed. In other words, provision is made for setting the pitches of the propellers so that each of them tends to absorb the same amount of power from the power source 41–44 as it would absorb if set at its commanded pitch and driven at its commanded shaft speed.

As will be appreciated, when the commanded shaft speed for a given propeller equals the required shaft speed for the propulsion system, the propeller absorbs the desired amount of power when set at its commanded pitch. If, however, there is a difference between the commanded and required shaft speeds, a different or corrected pitch is required to compensate for the difference. It is the purpose of this section to describe the manner in which signals representative of the corrected pitches for the propellers are provided during speed mode operation of the thrust controller. Thus, for the balance of this section it will be assumed that the thrust controller is in its speed mode and that both thrust control signals are outside the pitch change range so that the switches 103 and 104 are positioned to provide corrected pitch signals for the starboard and port pitch control servos 45 and 46. It will, of course, be understood that the discussion applies equally as well for the situation wherein the thrust control signal for only one propeller is outside the pitch change range, if it is remembered that in that event only the pitch control servo for the other propeller is supplied with a corrected pitch signal.

To carry out this aspect of the invention in its preferred form, means are provided for each propeller to define a predetermined nonlinear transfer function which yields the corrected pitch signal required for the propeller in response to any given ratio between the required shaft speed for the propulsion system and the commanded shaft speed for the propeller. More particularly, in the illustrated embodiment, the absolute values of the thrust control signal for the starboard and port propellers are fed from the absolute value devices 71 and 72 to the divided inputs of respective dividers 121 and 122 (FIG. 1A). The divisor inputs of the dividers 121 and 122 are supplied by the selector 73 with the thrust control signal which has the highest absolute value. Thus, when one or both of the thrust control signals is outside the pitch change range, the dividers 121 and 122 supply signals which respectively represent the ratios of the command shaft speeds for the starboard and port propellers to the required shaft speed for the propulsion system. These signals are, in turn, fed through respective speed mode function generators 123 and 124 to the multipliers 95 and 96.

The nonlinear transfer functions of the speed mode function generators 123 and 124 define, for the particular propellers of the propulsion system, the ratio of the corrected pitch required to the commanded pitch for the propeller as a function of the ratio of the commanded shaft speed for the propeller to the required shaft speed for the propulsion system. Consequently, for any given ratio of commanded shaft speed to required shaft speed represented by the signals supplied by the dividers 121 and 122, the function generators 123 and 124 supply pitch correction factors which, when multiplied by the commanded pitch signals, provide corrected pitch signals which are representative of the pitches at which the propellers absorb the same amounts of power as they would absorb if set at their commanded pitches and driven at their commanded shaft speeds. In other words, the function generators 123 and 124 compensate for the nonlinearity of the power versus shaft speed characteristics of the controllable pitch propellers.

As best illustrated by FIG. 2, the transfer functions for the speed mode function generators 123 and 124 can be determined by selecting a desired operating point for the propeller and noting the commanded power, shaft speed and pitch setting for the propeller at the selected operating point. Then the required shaft speed for the propulsion system is increased in incremental steps and the new or corrected propeller pitch required to maintain the power absorbed by the propeller substantially constant is determined at each step. Thus, a series of required shaft speeds and corresponding corrected pitch settings are obtained which may be compared to the commanded shaft speed and pitch setting corresponding to the selected operating point for purposes of determining the desired transfer function in terms of the desired ratios. Of course, the above process is preferably repeated for a number of selected operating points to thereby obtain enough data to average out errors in defining the ratio of the corrected pitch to the commanded pitch for each different ratio of commanded shaft speed to required shaft speed from substantially zero to substantially unity. It will be understood that the data for shaft speed ratios below the ratio of the idle speed to the maximum shaft speed is obtained by extrapolation of the curves shown in FIG. 2.

As can be seen by inspection of FIG. 4, the transfer function for the speed function generators 123 and 124 is distinctly nonlinear, but not so nonlinear that it is absolutely necessary for every application of the thrust controller. Indeed, a basic system providing a degree of thrust control not heretofore obtainable in propulsion systems having a plurality of controllable pitch propellers driven by a common power source is realized in the absence of the speed function generators 123 and 124 or, in other words, when there is a linear relationship between the ratio of the commanded shaft speed to the required shaft speed and the ratio of the corrected pitch to the commanded pitch. In the basic system, each of the corrected pitch signals are generally representative of the pitch at which the propellers have an effective shaft speed corresponding to their commanded shaft speed. With the speed function generators 123 and 124 added to the basic system, there is an improved thrust controller in that the corrected pitch signals provided by such a system afford an even closer correspondence between the effective and commanded shaft speeds of the propellers.

G. Corrected Pitch Signals — Power Mode

As a general rule, during power mode operation, the power source 41–44 delivers a substantially constant amount of power for any given set of thrust control signals. In this mode, the speed at which the propellers are driven may undergo substantial variations as the loads on them change, since the only constraint against such variations is that the shaft speed is prevented by the governor 74 from dropping below the idle speed for the propulsion system. Thus, for this mode, the propeller pitches are preferably set so that the power supplied by the power source 41–44 is distributed among the propellers in accordance with the ratios of their respective commanded power levels to the total power commanded from the power source.

When the thrust control signals for the propellers are all within the pitch change range, the commanded pitch signals define the pitch settings which afford the desired distribution of the power. When, however, the trust control signal for any of the propellers is outside the pitch change range, corrected pitch signals are required for each of the other propellers to ensure the appropriate distribution of the power.

In this section, attention is centered on the provision made for supplying corrected pitch signals during power mode operation. Previous sections have dealt with the commanded pitches signals and the selective application of the commanded and corrected pitch signals to the servos 45 and 46.

In the power mode, nonlinear transfer function means are again preferably provided to supply the corrected pitch signals required for the respective propellers. The transfer functions are, however, selected so that any corrected pitch signal selected for application to the pitch control servo for a given propeller represents the pitch setting at which the given propeller absorbs its commanded power from the total power supplied by the power source 41–44. To that end, in the illustrated embodiment, the commanded power signals for the starboard and port propellers are fed from the multipliers 82 and 84 to the dividend inputs of respective dividers 131 and 132. The divisor inputs of the dividers 131 and 132 are supplied by the averaging circuit 85 with the signal that is representative of the average power commanded per propeller from the power source 41–44. Hence, the dividers 131 and 132 provide signals which are respectively representative of the ratios of the commanded power levels for the starboard and port propellers to the average power commanded per propeller. These signals are, in turn, applied through multipliers 125 and 126 to respective power mode function generators 133 and 134 which have predetermined transfer functions selected to provide the appropriate corrected pitch signals. To ensure that the connected pitch signals supplied by the function generators 133 and 134 have polarities corresponding to the senses of the commanded thrust levels for the propellers, there are respective polarity sensors 127 and 128 connected to the outputs of the pitch program function generators 93 and 94. The sensors 127 and 128 provide unity reference signals which have polarities that are respectively dependent on the polarities of the commanded pitch signals for the starboard and port propellers. The reference signals provided by the polarity sensors 127 and 128 are, in turn, applied to the respective multipliers 125 and 126 so that the input signal to the power mode function generators 133 and 134 have polarities which respectively correspond to the senses of the commanded thrust levels for the starboard and port propellers.

The transfer function for the function generators 133 and 134 is derived from the curves shown in FIG. 2. Specifically, an operating point is selected for a given one of the propellers and the power absorbed by the propeller at the selected operating point is noted as being the commanded power for the propeller. Next, it is assumed that the power absorbed by the propeller is incrementally increased in steps and the propeller shaft speed corresponding to each step is determined. Thus, data defining the propeller shaft speed as a function of the average power commanded per propeller is obtained. Then, for each shaft speed, the pitch setting at which the propeller absorbs its commanded power is determined to thereby provide data representative of the corrected pitch for the propeller as a function of the average power commanded per propeller. Finally, to provide the desired transfer function, the average power commanded per propeller values are each inverted and multiplied by the commanded power for the propellers, so that the transfer function defines the corrected pitches for the propeller as a function of the ratio of its commanded power to the average power required per propeller as illustrated by FIG. 5.

Again, in keeping with good practices, the above procedure is repeated for a number of different selected operating points so as to tend to average out errors in defining the transfer function.

It is to be understood that the power mode function generators 133 and 134 may also be omitted from a basic thrust controller embodying the broader aspects of the present invention. The efficacy of a thrust controller wherein the corrected pitch signals are a linear function of the ratio of the commanded power to the average power commanded per propeller is readily confirmed by inspection of FIG. 5. The function generators 133 and 134 are, however, a substantial improvement in that they provide compensation for the inherent nonlinearity of the power versus speed characteristics of the controllable pitch propellers.

H. Exemplary Implementation

It will be recognized that the present invention may be implemented by generally conventional circuitry. However, in the interest of completeness, examples of suitable circuits for a number of the components of the controller have been shown in FIGS. 6A–6C. For those instances in which similar circuits are provided for both the starboard and port propellers, exemplary circuits have been shown for only the starboard propeller, since it will be understood that the showing and attendant description apply equally as well to the corresponding circuits for the port propeller.

1. Absolute Value Device 71

To provide the absolute value of the thrust control signal for the starboard propeller, the absolute value device 71 (FIG. 6A) may suitably comprise a diode 201 and an oppositely poled, unity gain operational amplifier-type half wave rectifier 202, such as are shown as being connected in parallel between the slider of the potentiometer 51 and a load resistor 203. Of course, without more, there would not be in accurate representation of the absolute value of the thrust control signal, since the voltage developed across the load resistor 203 is unavoidably offset from the actual absolute value of the thrust control signal by the forward voltage drop of one or the other of the diode 201 or the corresponding diode 204 of the rectifier 202. However, provision may be made to substantially eliminate the effects of the forward voltage drops of the diodes 201 and 204. For example, the load resistor 203 may be coupled to an output point 205 through a diode 206 which is poled oppositely of the diodes 201 and 204 and forward biased by current supplied by a constant current source 207. With that arrangement, the offset voltage may be substantially eliminated by selecting the diode 206 to match the diodes 201 and 204 and by adjusting the balance between the resistor 203 and the constant current source 207 so that the output point 205 is at substantially zero or ground potential under quiescent operating conditions, i.e., when the control handle 47 is in its dead center position so that the starboard thrust control signal is zero.

2. Averaging Circuit 85

To provide a signal representative of the average power commanded per propeller from the power source 41–44, the averaging circuit 85 (FIG. 6B) suitably comprises an operational amplifier 221 which has its inverting input coupled to a summing junction between a pair of input resistors 222 and 223, its non-inverting input returned to ground, and a feedback resistor 224 connected between its output and inverting input. The input resistors 222 and 223 are equal in value and respectively coupled to the outputs of the multipliers 82 and 84 to receive the commanded power signals for the starboard and port propellers. The feedback resistor 224, on the other hand, has a value selected relative to the values of the input resistors 222 and 223 to establish the closed loop gain for the operational amplifier 221 so that the signal appearing at its output is representative of the average power commanded per propeller. For example, in the illustrated embodiment wherein there are only two propellers involved, the closed loop gain of the operational amplifier is selected to equal one-half.

3. Amplifier 86

As shown, the amplifier 86 (FIG. 6B) is formed by another operational amplifier 231 which has its inverting input coupled to the output of the averaging circuit 85 via an input resistor 232, its non-inverting input returned to ground, and a feedback resistor 233 connected between its output and inverting inputs. The ratio of the feedback resistor 233 to the input resistor 232 is selected to define a closed loop gain equal to the number of propellers in the particular propulsion system of concern, which, in this instance, is two.

Figure 6A:
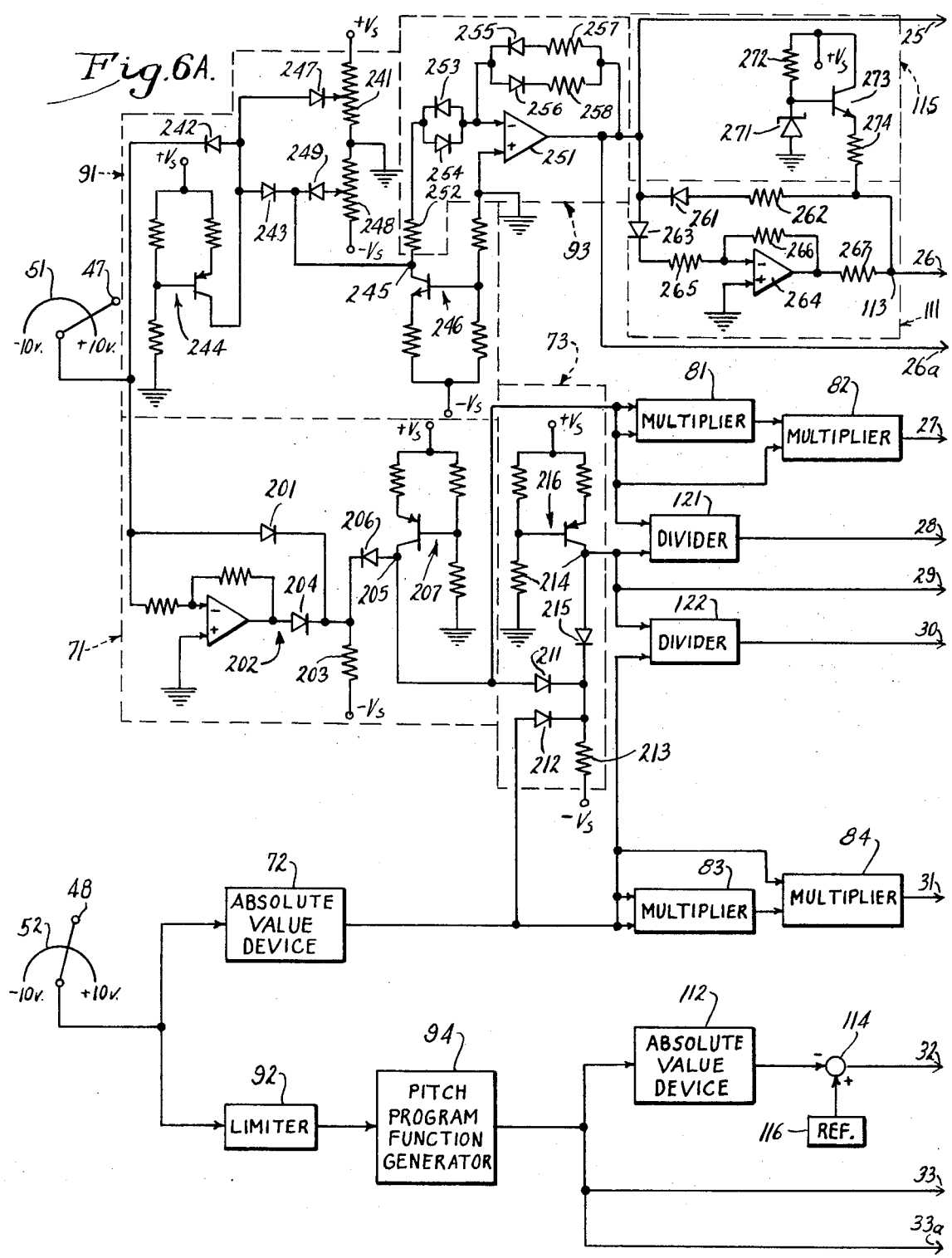

4. Limiting Circuit 91 (FIG. 6A)

Turning next to the exemplary limiting circuit 91, it will be seen that in response to positive thrust control signals up to a limit defined by the setting of the slider of a potentiometer 241, a pair of matched diodes 242 and 243 are forward biased by current supplied by a constant current source 244. The diodes 242 and 243 are connected between the slider of the potentiometer 51 and the output point 245 of the limiter which, in turn, is returned to ground through a constant current drain 246 and a suitable negative supply voltage. Consequently, an accurate representation of the particular positive thrust control signal supplied appears at the output 245, so long as the thrust control signal is below an upper or positive limit. If, however, the positive thrust control signal exceeds the positive limit defined by the setting of the potentiometer 241, the diode 247 becomes forward biased to thereby limit the voltage appearing at the output 245 to the positive limit voltage. On the other hand, in response to negative thrust control signals down to a lower or negative limit defined by the setting of the slider of a potentiometer 248, the diodes 242 and 243 are again forward biased by current supplied by the constant current source 244 so that an accurate representation of the particular thrust control signal appears at the output 245. But, when any negative thrust control signal drops below the negative limit defined by the setting of the potentiometer 243 248, the diode 249 becomes forward biased and the voltage appearing at the output point 245 is then clamped to the negative limit value.

5. Pitch Program Function Generator 93

As illustrated, the function generator 93 (FIG. 6A) comprises an operational amplifier 251 which has its inverting input coupled to the output 245 of the limiting circuit 91 via an input resistor 252 and a pair of parallel connected, oppositely poled diodes 253 and 254, and its non-inverting input returned to ground. To illustrate that the function generator 93 may have different transfer functions for positive and negative thrust control signals, the operational amplifier 251 is shown as having a pair of parallel, oppositely poled feedback circuits connected between its output and inverting inputs. Specifically, the feedback circuits are shown as including respective diodes 255, 256 and series connected resistors 257, 258. The resistors 257 and 258 may have different values to thereby ensure that the operational amplifier 251 has different closed loop gains for positive and negative thrust control signals, i.e., a nonlinear transfer function. Alternatively, the resistors 257 and 258 may have equal values to thereby establish a substantially linear transfer function for the function generator 93. Again, it is noted that the transfer function for the function generator 93 is selected to provide the desired commanded pitch versus control handle position program.

5. Full Commanded Pitch Detector 111, 113 and 115

As will be recalled, the detector employed to sense a command for a full forward or reverse pitch setting of the starboard propeller comprises an absolute value device 111, a comparator 113, and a reference source 115.

Typically, the absolute value device 111 (FIG. 6A) may include a pair of parallel paths, viz., a non-inverting path for negative commanded pitch signals and an inverting path for positive commanded pitch signals. As shown, therefore, the negative commanded pitch signals are applied from the pitch program function generator 93 to the comparator 113 through a diode 261 and a resistor 262. The positive commanded pitch signals, on the other hand, are passed through an oppositely poled diode 263, inverted by a unity gain operational amplifier 264 with its usual input and feedback resistors 265 and 266, and applied to the comparator 113 through a resistor 267. It will be noted that in the illustrated embodiment the comparator 113 is simply a summing node at the input to the switching circuit 117. The resistors 262 and 267 should, of course, have equal values to ensure that the voltage appearing at the summing node 113 is not dependent on the polarity of the commanded pitch signal.

The illustrated reference source 115 is formed by a reversely poled Zener diode 271 which is connected between a suitable supply voltage and ground through a current limiting resistor 272. The Zener diode 271 is selected to have a breakdown voltage substantially equal to, but opposite in polarity from, the absolute value of the commanded pitch signal that is applied to the summing node 113 when a full forward or reverse pitch is commanded for the starboard propeller. Preferably the Zener diode 271 is isolated from the summing node 113 to prevent it from effecting the input impedance of the switching circuit 117. It is, therefore, shown as being connected across the base-emitter circuit of a transistor 273 which is in an emitter follower configuration with its emitter coupled to the summing node 113 by a resistor 274. Thus, for proper selection of the breakdown potential of the Zener diode 271, the voltage drop across the base-emitter diode of the transistor 273 should be added to the absolute value of the commanded pitch signal corresponding to full pitch of the propeller. Furthermore, to maintain the input impedance to the switching circuit 117 at the level established by the resistors 262 and 267, the resistor 274 should have a resistance equal to the resistance of the resistors 262 and 267.

6. Switching Circuit 117

The importance of carefully controlling the input impedance for the switching circuit 117 (FIG. 6B) will be seen to result from the fact that an operational amplifier 281 is used in the exemplary embodiment as a driver stage for the switch 117. Specifically, the operational amplifier 281 has its inverting input connected to the summing node 113. A fast response to changes in the polarity of the summing function carried out at the node 113 is provided by supplying positive feedback for the operational amplifier 281 via a resistor 282 which is connected between its output and non-inverting input. Further, in keeping with accepted practices, the non-inverting input of the amplifier 281 is returned to ground by a drift stabilizing resistor 282.

Because of the positive feedback, an undesirably large voltage swing tends to occur at the output of the operational amplifier 281. Accordingly, to limit the swing to the range required for the subsequent portions of the switching circuit 117, a pair of oppositely poled, parallel connected negative feedback paths comprising respective pairs of diodes 284, 285 and 286, 287 are connected between the output and inverting input of the operational amplifier 281. The limiting may be accomplished without much, if any, effect on the speed of response of the operational amplifier 281 by returning the junctions between the diode pairs 284, 285 and 286, 287 to ground through a small resistor 288 to thereby provide a low impedance path for rapidly charging and discharging the inherent junction capacitances of the diodes.

To energize and de-energize the relay 106 in dependence on whether or not full pitch is commanded for the starboard propeller, the output of the operational amplifier 281 is coupled through a current limiting resistor 289 to the base of a transistor 291. The transistor 291 is, in turn, connected with another transistor 292 in a Darlington configuration for carrying the current that is drawn when the relay coil 106 is energized. A diode 293 is connected in parallel with the coil 106 and poled to surpress transients that may be developed as the coil 106 is energized and de-energized. For the same reason, a diode 294 is connected in parallel with the coil 105.

7. Speed and Power Mode Function Generators 123 and 133

As shown, the nonlinear transfer functions of the speed mode and power mode function generators 123 and 133 (FIG. 6B) are both provided by successive linear approximation techniques. Thus, only the speed mode function generator 123 need be described, since the same description applies to the power mode function generator 133.

More particularly, the illustrated speed mode function generator 123 has a first set of resistors 301–303 connected to the output of the divider 121 and another set of resistors 304–306 connected to a suitable positive voltage source. The resistors 301–306 are paired so that each resistor pair 301, 304, 302, 305 and 303, 306 comprises a respective resistor from each set. The resistor pairs 301, 304, 302, 305 and 303, 306 are, in turn, joined at respective summing nodes and connected through respective diodes 307–309 and input resistors 313–315 to the inverting input of an operational amplifier 312. The operational amplifier 312, of course, has the usual negative feedback resistor 316.

The current drawn through the diodes 307–309 is summed at the inverting input of the operational amplifier 281 to supply the input signal therefor. Under quiescent operating conditions, the diodes 307–309 are all back biased by the bias voltages applied thereto through the resistors 304–306. However, when an output signal, which in this case is presumed to be negative, is supplied by the divider 121, part or all of the diodes 307–309 may become forward biased. The particular ones of the diodes 307–309 that do become forward biased depends on the amplitude of the output signal provided by the divider 121 as compared to the amplitude of the output signal provided by the divider 121 as compared to the amplitude of respective back bias voltages for the diodes. That is, a given one of the diodes 307–309 becomes forward biased only when the signal supplied by the divider 121 is sufficient to overcome the back bias applied to the particular diode. Accordingly, it will be seen that when the resistors 304–306 are selected to apply different back biases to the diodes 307–309 under quiescent operating conditions, different closed loop gains for the operational amplifier 312 may be defined for different levels of output signals from the divider 121. As a result, the operational amplifier 312 has a nonlinear transfer function which can be tailored as desired by setting the back biases of the diodes 307–309 at the appropriate levels and, if necessary, by adding further parallel input branches, such as 301, 304, 307 and 313, to the operational amplifier 312.

It should be noted that in the case of the power mode function generators, provision is required for providing connected pitch signals for ahead and astern commanded thrust levels. Thus, even though provision for only one commanded thrust level sense has been shown, it will be understood that similar, but oppositely polarized, means should be provided for the other or opposite thrust level sense.

8. Highest Value Selectors

For descriptive purposes, the selector 73 (FIG. 6A) has been selected as being representative of the highest value selectors for the thrust controller. As shown, the selector 73 comprises a pair of diodes 211 and 212 which have their anodes respectively coupled to the outputs of the absolute value devices 71 and 72 and their cathodes coupled to a common load resistor 213. As will be appreciated, the diode 211 or 212 which at any given time has the more positive anode voltage is forward biased to develop a voltage across the load resistor 213 which reverse biases the other of the diodes. Again, to eliminate the offset effects of the forward voltage drops of the diodes 211 and 212, an oppositely poled matching diode 215 connects the load resistor 213 to an output point 214. Forward bias current is supplied for the diode 215 by a constant current source 216, and the balance between the load resistor 213 and the constant current source 216 is adjusted so that the output point 214 is at zero potential under quiescent operating conditions. Thus, in the case of the selector 73, an accurate representation of the highest of the absolute values of the thrust control signals is produced at the output 214.

9. Constant Current Sources and Drains

Repeated references have been made to constant current sources and drains meaning thereby to indicate a device which supplies or drains, as the case may be, a substantially constant amount of current under all operating conditions of the thrust controller. More particularly, taking by way of example the constant current source 335 that is provided for the selector circuit 76 (FIG. 6C), it will be seen that it comprises a PNP transistor 341 which has its base connected to the juncture between a pair of resistors 342 and 343 which, in turn, are connected between a suitable positive voltage supply and a point of ground potential. Further, the emitter of the transistor 341 is connected to the positive supply through a self-biasing resistor 344. The resistors 342–344 are selected so that the transistor 341 conducts from its emitter through its collector the desired amount of current under quiescent operating conditions. Then, by virtue of the self-biasing effect of the resistor 344, the current drawn by the transistor 341 tends to remain constant as the voltage appearing at its collector changes. For example, if the collector voltage increases so as to tend to decrease the current drawn by the transistor 341, there is a corresponding drop in the voltage developed across the resistor 344. Thus, the forward bias on the base-emitter junction of the transistor 341 and, therefore, the conductivity of its collector-emitter circuit increases to compensate for the increase in its collector voltage. If on the other hand, the collector voltage drops, the voltage developed across the resistor 344 increases. Thus, there is a drop in the base-emitter bias of the transistor 341 which decreases the conductivity of its collector-emitter circuit so as to compensate for the lower collector voltage.

A constant current drain operates on the same principle as the constant current source. Circuit-wise the only notable changes are the use of a NPN transistor and a negative supply voltage.

10. Polarity Sensor 127

Finally, the polarity sensor 127 (FIG. 6B) suitably comprises another operational amplifier 351 which has its inverting input coupled to the starboard pitch program function generator 93 via an input resistor 353, its non-inverting input returned to ground, and a feedback resistor 352 connected between its output and inverting input. Preferably, in the interest of providing a fast response to changes in the polarity of the commanded pitch signal for the starboard propeller, the input and feedback resistors 353 and 352 are selected to define a high closed loop gain for the operational amplifier 351. Further, to insure that the operational amplifier 351 supplies a reference signal which is representative of a unity factor but has a polarity that is dependent on the polarity of the commanded pitch signal for the starboard propeller, there is connected in parallel with the feedback resistor there is there is a back-to-back or double anode Zener diode 354.

I. Conclusion

From the foregoing it will now be appreciated that the present invention provides a thrust controller which affords much closer control than has been heretofore obtainable over the amounts of thrust delivered by commonly driven controllable pitch propellers in marine propulsion systems. It will be understood that the thrust controller may be used for either speed or power mode operation of the propulsion system and that it is compatible with an operation of the propulsion system wherein separate engines are dedicated to the several propellers. Finally, it will be seen that a significant improvement for the thrust controller can be realized by including nonlinear function generators in the pitch correction portions of the controller, since the function generators compensate for the inherent nonlinearity of the power versus speed characteristics of the controllable pitch propellers.

We claim as our invention:

1. A thrust controller for a propulsion system having a power source for driving a plurality of controllable pitch propellers, said controller comprising the combination of input means for supplying thrust control signals having values representative of respective commanded thrust levels for said propellers, power source control means responsive to said thrust control signals for supplying a power source control signal representative of a power level required from said power source to satisfy the commanded thrust levels for said propellers while maintaining said propellers rotating at least at a predetermined idle speed for said propulsion system, pitch control means responsive to said thrust control signals for supplying respective pitch control signals for said propellers, each of said pitch control signals having a value which is substantially representative under any given set of commanded thrust levels for said propellers of the pitch at which its respective propeller absorbs the power it requires from the power source to satisfy its commanded thrust level.

2. The thrust controller of claim 1 wherein said thrust control signals are also representative of respective commanded speeds for said propellers, and said power source control means maintains said propellers rotating at a substantially constant shaft speed which is selected to be the higher of said predetermined idle speed and the highest of said commanded speeds.

3. The thrust controller of claim 1 wherein said power source control means includes absolute value means coupled to said input means for providing respective commanded speed signals for said propellers in response to said thrust control signals, first selector means coupled to said absolute value means for selecting the signal representative of the highest of the commanded speeds, reference means for supplying a reference signal representative of a commanded speed equal to said predetermined idle speed, second selector means for selecting as a required speed signal the higher of the selected speed signal and the reference signal, means responsive to the shaft speed of said propellers for providing a signal representative of their actual shaft speed, and governor means responsive to said required speed signal and said actual speed signal to provide a speed error signal for increasing the power supplied by said power source whenever the actual shaft speed of said propellers drops below the required speed, whereby said propellers are driven at a substantially constant speed which is selected to be the higher of said predetermined idle speed and the highest of said commanded speeds.

4. The thrust controller of claim 1 wherein said thrust control signals are also representative of respective commanded power levels for said propellers, and said power source control means responds thereto so as to maintain the power delivered by said power source substantially constant while preventing the speed at which said propellers are rotated from dropping below said idle speed.

5. The thrust controller of claim 1 wherein said power source control means includes first means coupled to said input means for providing respective commanded power signals for said propellers in response to their thrust control signals, summing means coupled to said first means for summing said commanded power signals to provide a signal representative of the total power commanded from said power source, reference means for supplying a reference signal representative of said predetermined idle speed, means responsive to the speed at which said propellers are rotated to provide a signal representative of the actual shaft speed of said propellers, governor means responsive to said reference signal and said actual shaft speed signal for providing a speed error signal whenever the actual shaft speeds of said propellers drops below said idle speed, and selector means coupled to said summing means and to said governor means for selecting the higher of said total power signal and said error signal as a control signal for said power source, whereby said power source is controlled in response to any given set of thrust control signals so as to deliver a substantially constant amount of power while preventing the shaft speed of said propellers from dropping below said idle speed.

6. A thrust controller for a propulsion system having a power source for driving a plurality of controllable pitch propellers, said controller comprising the combination of input means for supplying thrust control signals having values representative of respective commanded thrust levels for said propellers., pitch program means coupled to said input means for providing respective commanded pitch signals for said propellers in response to their thrust control signals, each of said commanded pitch signals being representative of a full pitch setting for its respective propeller whenever the thrust control signal for that propeller is outside a predetermined pitch change range, absolute value means coupled to said input means for providing respective commanded speed signals for said propellers in response to their thrust control signals, selector means coupled to said absolute value means for selecting the signal representative of the highest of said commanded speeds, divider means coupled to said absolute value means and to said selector means for providing signals representative of the ratios of the commanded speeds for the respective propellers to the highest of said commanded speeds, and multiplier means selectively coupled to said pitch program means and said divider means in response to the commanded pitch signal for any of said propellers having a value corresponding to a full pitch setting of the propeller to thereby modify the commanded pitch signals for the other propellers in accordance with the ratios of their respective commanded speeds to the highest of said commanded speeds.

7. The thrust controller of claim 6 further including power source control means comprising reference means for supplying a reference signal representative of said predetermined idle speed, another selector means coupled to the first mentioned selector means and to said reference means for selecting the higher of said reference signal and the highest of said commanded speed signals as a required speed signal, and governor means coupled to said other selector means and responsive to the actual shaft speed of said propellers for providing a speed error signal to increase the power supplied by said power source whenever the actual shaft speed drops below the required shaft speed, whereby said propellers are driven at a substantially constant speed for any given set of thrust control signals.

8. A thrust controller for a propulsion system having a power source for driving a plurality of controllable pitch propellers, said control comprising the combination of input means for supplying thrust control signals having values representative of respective commanded thrust levels for said propellers, pitch program means coupled to said input means for providing respective commanded pitch signals for said propellers in response to said thrust control signals, each of said commanded pitch signals being representative of a full pitch setting for its propeller when the thrust control signal for its propeller is outside a predetermined pitch change range, means coupled to said input means for providing signals representative of respective commanded power levels for said propellers in response to said thrust control signals, means responsive to said commanded power signals for providing a signal representative of the average power commanded per propeller, means responsive to said commanded power signals and said average power commanded per propeller signal for providing signals representative of the ratios of the command power levels for the respective propellers to the average power commanded per propeller, means for providing respective corrected pitch signals for said propellers in response to said ratio signals, and 9. The thrust controller of claim 8 further including power source control means comprising means for amplifying said average power commanded per propeller signal by a factor substantially equal to the number of said controllable pitch propellers to thereby provide a signal representative of the total power commanded from said power source, reference means for supplying a reference signal representative of a predetermined idle speed for said propulsion system, governor means responsive to said reference signal for providing a speed error signal whenever said propellers are driven at a speed below said idle speed, selector means coupled to said amplifying means and said governor means for selecting the higher of said total power signal and said speed error signal as a control signal for said power source whereby said power source delivers the power necessary to satisfy said commanded thrust levels while preventing the speed at which said propellers are driven from dropping below said idle speed.

10. In a thrust controller for a marine propulsion system having a plurality of controllable pitch propellers driven at the same speed by a common power source, means for supplying thrust control signals defining respective commanded thrust levels for said propellers, means responsive to said thrust control signals for providing signals representing respective commanded pitches for said propellers, and means coupled to said power source for increasing the speed at which said propellers are driven in response to any of said thrust control signals having a value outside a predetermined pitch change range, the improvement comprising means actuated in response to any of said commanded thrust levels having a value outside said pitch change range for providing for each of said propellers that has a commanded thrust level below the highest of said commanded thrust levels a signal representative of a pitch for said propeller that is less than its commanded pitch.

11. In a thrust controller for a marine propulsion system having a plurality of controllable pitch propellers driven by a common power source, means for supplying thrust control signals defining respective commanded thrust levels for said propellers, means responsive to said thrust control signals for providing signals representative of respective commanded pitches for said propellers, means responsive to said thrust control signals for providing signals representative of respective commanded power levels for said propellers, means responsive to said commanded power signals for providing a signal representative of the total power commanded from said power source, means for supplying a reference signal representative of a predetermined idle speed for said propulsion system, means responsive to the speed at which said propellers are driven for supplying a signal representative of the actual speed of said propellers, means responsive to said reference signal and said actual speed signal for providing a speed error signal whenever said propellers are driven at a speed below said reference speed, and means for selecting the higher of said total power signal and said speed error signal as a signal to control said power source whereby said power source delivers the power necessary to satisfy the commanded thrust levels for said propellers while preventing the speed at which said propellers are driven from dropping below said idle speed, the improvement comprising means responsive to said commanded power signals for providing a signal representative of the average power commanded per propeller, means responsive to said commanded power signals and said average power commanded per propeller signal to provide for each propeller a corrected pitch signal which has a value related to the ratio of the commanded power for the propeller to the average power commanded per propeller, and means for selectively applying said commanded and corrected pitch signals to said propellers, whereby the pitch of each propeller is determined by its commanded pitch signal when the thrust control signals for all of the other propellers are within a predetermined pitch change range and by its corrected pitch signal when the thrust control signal for any of the other propellers is outside said pitch change range so that each propeller absorbs substantially the power commanded therefor.

12. In a thrust controller for a marine propulsion system having a plurality of controllable pitch propellers driven by a common power source, means for supplying thrust control signals for defining respective commanded thrust levels for said propellers, means responsive to said thrust control signals for providing signals representative of respective commanded pitches for said propellers, means responsive to said thrust control signals for providing signals representative of respective commanded speeds for said propellers, means for selecting the signal representative of the highest of said commanded speeds, means for supplying a reference signal corresponding to a predetermined idle speed for said propulsion systems, means for selecting the higher of said reference signal and said selected commanded speed signal as a required speed signal, means responsive to the speed at which said propellers are driven for providing a signal representative of the actual speed of said propellers, and governor means for providing a speed error signal for increasing the power supplied by the power source whenever the actual speed of said propellers drops below said required speed, the improvement comprising means responsive to said commanded speed signals and to the highest of said commanded speed signals for providing a signal for each propeller that is representative of the ratio of its commanded shaft speed to the highest of said commanded shaft speeds, means actuated when the thrust control signal for an one of said propellers is outside a predetermined pitch change range to provide respective corrected pitch signals for the other of said propellers, each of said corrected pitch signals being related to the ratio of the commanded speed for its respective propeller to the highest of said commanded speeds.

* * * * *